(12) United States Patent
Åsen et al.

(10) Patent No.: US 6,767,527 B1
(45) Date of Patent: Jul. 27, 2004

(54) METHOD FOR RECOVERING $CO_2$

(75) Inventors: Knut Ingvar Åsen, Porsgrunn (NO); Kjersti Wilhelmsen, Porsgrunn (NO); Tor Bruun, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/857,415

(22) PCT Filed: Mar. 17, 1999

(86) PCT No.: PCT/NO99/00091
§ 371 (c)(1),
(2), (4) Date: Aug. 29, 2001

(87) PCT Pub. No.: WO00/33942
PCT Pub. Date: Jun. 15, 2000

(30) Foreign Application Priority Data

Dec. 4, 1998 (NO) ................................................ 985706

(51) Int. Cl.$^7$ .............................................. C01B 31/20
(52) U.S. Cl. ............................. 423/437.1; 95/45; 95/54
(58) Field of Search ......................... 423/437.1; 95/54, 95/45

(56) References Cited

U.S. PATENT DOCUMENTS

| | | | | |
|---|---|---|---|---|
| 5,245,110 A | * | 9/1993 | Van Dijk et al. | ........... 585/946 |
| 5,562,754 A | | 10/1996 | Kang et al. | ..................... 95/54 |
| 5,565,017 A | * | 10/1996 | Kang et al. | ..................... 95/14 |
| 5,888,272 A | * | 3/1999 | Prasad et al. | ................... 95/45 |
| 5,976,223 A | * | 11/1999 | Prasad et al. | ................. 95/117 |

FOREIGN PATENT DOCUMENTS

| | | |
|---|---|---|
| EP | 0778069 | 6/1997 |
| EP | 0882486 | 12/1998 |
| EP | 0916386 | 5/1999 |
| NO | 974399 | 9/1997 |
| WO | 9855208 | 12/1998 |

* cited by examiner

*Primary Examiner*—Stuart L. Hendrickson
*Assistant Examiner*—Peter J Lish
(74) *Attorney, Agent, or Firm*—Wenderoth, Lind & Ponack, L.L.P.

(57) ABSTRACT

A method for recovering substantially all carbon dioxide generated in a combustion process where the method comprises the following steps: a) a sweep gas is used to pick up oxygen on the permeate side of a mixed conducting membrane in a first stage which is capable of separating oxygen from a hot air stream fed to the retentate side of the membrane; b) the sweep gas containing oxygen is applied as oxidant in a combuster in the first stage where a carbon containing fuel is combusted; c) hot combustion products of step b) containing $CO_2$, $H_2O$ and a low concentration of $O_2$ is used as sweep gas in a membrane in a second stage downstream the combuster in step b); d) the concentration of oxygen in the sweep gas of step c) is increased in the membrane in the second stage (step c) to a sufficiently high level to be used as oxidant in the combuster in the second stage; e) and the steps c)–d) are repeated in one or more stages. Furthermore, the present invention relates to use of the method in different processes.

8 Claims, 2 Drawing Sheets

METHOD FOR RECOVERING CO₂

This application is a 371 application of PCT/NO99/00091 filed Mar. 17, 1999.

The present invention relates to a method for recovering substantially all $CO_2$ generated in a combustion process which includes an application of a mixed conducting membrane. Furthermore, the present invention relates to use of this method.

Due to the environmental aspects of $CO_2$, the possibilities for reducing the emissions of this compound to the atmosphere from combustion processes has been widely discussed.

Conventional combustion processes, used for carbon containing fuels and where the oxygen source is air, having carbon dioxide concentrations of 3–15% in the combustion products, hereinafter called exhaust gas, dependent on the fuel and the applied combustion- and heat recovery process. The reason the concentration is this low is because air is made up of about 78% by volume of nitrogen.

Thus, a reduction in the emission of carbon dioxide to the atmosphere makes it necessary to either separate the carbon dioxide from the exhaust gas, or raise the concentration to levels suitable for use in different chemical processes or for injection and deposition in e.g. a geological formation for long term deposition or for enhanced recovery of oil.

$CO_2$ can be removed from cooled exhaust gas, normally discharged off at near atmospheric pressure, by means of several separation processes e.g. chemical active separation processes, physical absorption processes, adsorption by molecular sieves, membrane separation and cryogenic techniques. Chemical absorption for instance by means of alkanole amines is e.g. considered as the most practical and economical method to separate $CO_2$ from exhaust gas. The separation processes, however, require heavy and voluminous equipment and will consume a substantial amount of heat or power. Applied in a power generation process, this process will reduce the power output with around 10% or more.

An increase of the concentration of $CO_2$ in the exhaust gas to levels suitable for use in different chemical processes or for injection and deposition e.g. in a geological formation for long term deposition or for enhanced recovery of oil from an oil reservoir is possible by burning fuel in pure oxygen instead of air.

Commercial air separation methods (e.g. cryogenic separation or pressure swing absorption (PSA)) used to produce pure oxygen require 250 to 300 KWh/ton oxygen produced. Supplying oxygen e.g. to a gas turbine by this methods will decrease the net power output of the gas turbine cycle by at least 20%. The cost of producing oxygen in a cryogenic unit will increase the cost of electric power substantially and may constitute as much as 50% of the cost of the electric power.

However, a less energy demanding methode than the separation methods mentioned above is known from European patent application 0658 367-A2 which desribes an application of a mixed conducting membrane which is integrated with a gas turbine system by heating air in a gas turbine combuster and further by selective permeation of oxygen through the membrane. Pure oxygen near atmospheric pressure or below and at high temperature is recovered from the permeate side of the conducting membrane. An oxygen partial pressure difference causes oxygen to be transported through the membrane by reduction of oxygen on the high oxygen partial pressure side (rententate side) and oxidation of oxygen ions to oxygen gas on the low oxygen partial pressure side (the permeate side). In the bulk of the membrane oxygen ions are transported by a diffusion process. Simultaneously the electrons flow from the permeate side back to the feed side of the membrane.

Application of a sweep gas in combination with a mixed conducting membrane to lower the oxygen partial pressure to increase the degree of oxygen removal or oxygen recovery is known from the U.S. Pat. No. 5,562,754. In this patent a method for combined production of oxygen and power is disclosed by heating air in a gas turbine combuster and by selective permeation of oxygen through the membrane. In order to improve the efficiency of gas separation by the membrane, the permeate side of the membrane is swept by e.g. steam supplied for instance from the heat recovery section of the power plant. The sweep gas is heated in a separate high temperature heat exchanger. The application of sweep gas will reduce the partial pressure of oxygen on the permeate side of the membrane and thereby increase the flux of oxygen through the membrane. However, this require a certain amount of sweepgas and therefore a certain energy amount to generate this sweep gas. This will therefore decrease the net power output of the power generating process.

Application of a sweep gas in combination with a mixed conducting membrane is also known from Norwegian patent application NO-A-972632 (published Jul. 12, 1998). This patent describes a power and heat generating process where a fuel is combusted with an oxidant, which is an $O_2/CO_2/H_2O$-containing gaseous mixture, which is supplied from a mixed conducting membrane. The oxygen is picked up from the permeate side of the mixed conducting membrane by means of a sweep gas. The sweep gas is the product or part of the product from at least one combustion process upstream the membrane. In this patent application the sweep gas, or part of the sweep gas, containing a mixture of mainly $CO_2$ and $H_2O$ also act as the working fluid in a gas turbine cycle. The amount of sweep gas is related to the amount of working fluid required in the gas turbine cycle i.e. to control the temperature in the gas turbine combuster. Working fluid is the gas (oxidant and fuel) transported through the gas turbine system. Air fed to the retentate side of this membrane is heated by combusting a fuel in the air stream in a burner.

To obtain a sufficient high flux of oxygen through the membrane a rather high temperature is required (600–1500° C.). On the air side of the membrane this may be accomplished by combusting a fuel in the air stream in a burner to increase the temperature of the air fed to the membrane, for instance as disclosed in European patent application 0658 367-A2 or as described in Norwegian patent application NO-A-972632 (published Dec. 7, 1998). The most convenient and least expencive method is to use a carbon containing fuel, e.g. a fossil fuel. However, by means of this method the heated air stream will contain $CO_2$ generated in the burner. The $CO_2$ concentration in the oxygen depleteded air stream discharged from the retentate side of the membrane will be less than about 10% and in most cases less than 3%. If recovery of all generated $CO_2$ in a combustion process is desirable, due to environmental aspects of $CO_2$, an oxygen depleted air stream containing low $CO_2$-concentrations is not desirable.

Application of a staged mixed conducting membrane process is known from U.S. Pat. No. 5,447,555 which describes a method for producing pure oxygen. In this process high purity oxygen is recovered from air by a high-temperature ion transport membrane system comprising two or more stages in which each stage operates at a different feed side to permeate side pressure ratio. Operation of the system in multiple stages at controlled pressure ratios produces oxygen at a lower specific power consumption compared with single-stage operation. Sweep gas is not used in this US patent.

The main object of this invention was to arrive at an energy efficient method to recover substantially all $CO_2$ generated in a combustion process.

The described object can be fulfilled by application of a method which include an application of a mixed conducting membrane.

Hot steam or a mixture of steam and $CO_2$ (e.g. recycled exhaust gas) is used as sweep gas to pick up oxygen on the permeate side of a mixed conducting membrane (MCM) in a first stage. The membrane is capable of separating oxygen from a hot air stream fed to the retentate side of the membrane. Sweep gas now containing oxygen is applied as oxidant in a catalytic or non catalytic combustion process where a carbon containing fuel is combusted. Heat generated in the combustion process is used to heat air fed to the retentate side of the membrane.

The hot combustion products, i.e. the exhaust gas, containing $CO_2$, $H_2O$ and a low concentration of $O_2$ is used as sweep gas in a second MCM stage and the concentration of oxygen in the sweep gas is increased in the second membrane stage to a sufficiently high level to be used as oxidant in a second combustion stage. Heat generated in the second combustion process is also used to heat air to the MCM-process. Hot combustion products leaving the second combustion stage is used as sweep gas to pick up more oxygen in a third MCM-stage to be used as oxidant in a third combustion stage. The number of required combustion stages and MCM-stages depends on the amount of sweep gas fed to MCM-stage one and on the required pre-heating temperature of air to the retentate side of the MCM-process.

The oxygen produced in the membrane is removed between each stage by combustion with fuel in a combuster. The partially cooled $CO_2$ containing exhaust gas with a low concentration of oxygen is used as sweep gas in the next MCM stage.

This will reduce the amount of sweep gas necessary for production of a given amount of oxygen and thus reduce the size of equipment necessary for producing sweep gas to the first MCM stage. Application of e.g. 10 stages will reduce the amount of sweep gas with about 95% compared with a single stage process and reduce the energy required to generate sweepgas in the same order of magnitude.

Air fed to the retentate side of each mixed conducting membranes is heated by heat exchanging with hot exhaust gas generated in at least one combuster.

If sweep gas is not generated during the process or used as a working fluid in a gas turbine cycle the sweep gas has to be generated in a separate process. If sweep gas is generated in a separate process the cost of sweep gas is related to the required amount of sweep gas. The cost of sweep gas generation will be reduced if the amount of sweep gas used in the air heating process is reduced. In a one stage mixed conducting membrane process this reduced amount of sweep gas will, however, reduce the rate of oxygen transport through the membrane. This will further increase the required membrane area and thus the membrane costs. Otherwise the sweep gas pressure has to be reduced. This will, however, increase the pressure drop of oxygen through the membrane and thus reduce the efficiency of the heat generating process.

In the present invention each stage operates at nearly the same pressure and the staged process will not increase the membrane area requirement. Since oxygen is removed between each stage the driving forces for transport of oxygen through the membrane will increase and reduce the membrane area requirement and the costs.

The problems mentioned above concerning reduced transport of oxygen, increased costs or reduced efficiency, if the amount of sweep gas, which may be steam or a mixture of steam and/or recycled exhaust gas, is reduced, is solved by application of the staged combined mixed conducting membrane and combustion process described in the present invention.

In order to avoid excessive temperatures in the combustion process, comprising use of catalytic or non catalytic combusters, the exhaust gas which is used as sweep gas in a subsequent mixed conducting membrane stage, is cooled between the stages by heat exchanging with air to generate hot air. Furthermore the temperature in the combuster stages are controlled by varying the concentration of oxygen in the sweep gas.

In order to obtain a sufficient high flux of oxygen through the mixed conducting membranes a high air temperature is required which is achieved by the heat exchanging method described above according to the present invention. The air stream is heated in several stages in heat exchangers located between the membrane stages or is divided into several streams and each stream is heated in a heat exchanger located between two membrane stages.

Heated air generated by the method according to the present invention can be used to generate pure oxygen in a mixed conducting membrane.

Furthermore, heated air generated by the method according to the present invention can be used to generate synthesis gas consisting of one or more of the components CO, $CO_2$, $H_2$ and $N_2$ or for generating heat in a mixed conducting membrane reactor where the membrane reactor is capable of reacting a mixture of steam and a carbon containing fuel with oxygen permeated through the said membrane to make synthesis gas and/or heat.

Further, the method according to the present invention is used in a heat and/or power generating process.

Further, the $CO_2$-containing exhaust gas generated by the method according to the present invention is used for enhanced oil and natural gas recovery or for injection in a gelogical formation or is used in a chemical process to make carbon containing products. Oxygen eventually left in the $CO_2$ containing combustion gas exit in the last combustion stage can be removed in a catalytic oxidation reactor or in a combined mixed conducting membrane and partial oxidation reactor as described in patent application NO-A-972631 (published Jul. 12, 1998).

In a further embodiment of the invention the $CO_2$ containing exhaust gas and/or the oxygen depleted air stream is depressurized in a turbine to generate power. The invention will be further explained and envisaged in the examples and corresponding figures.

Figure 1:
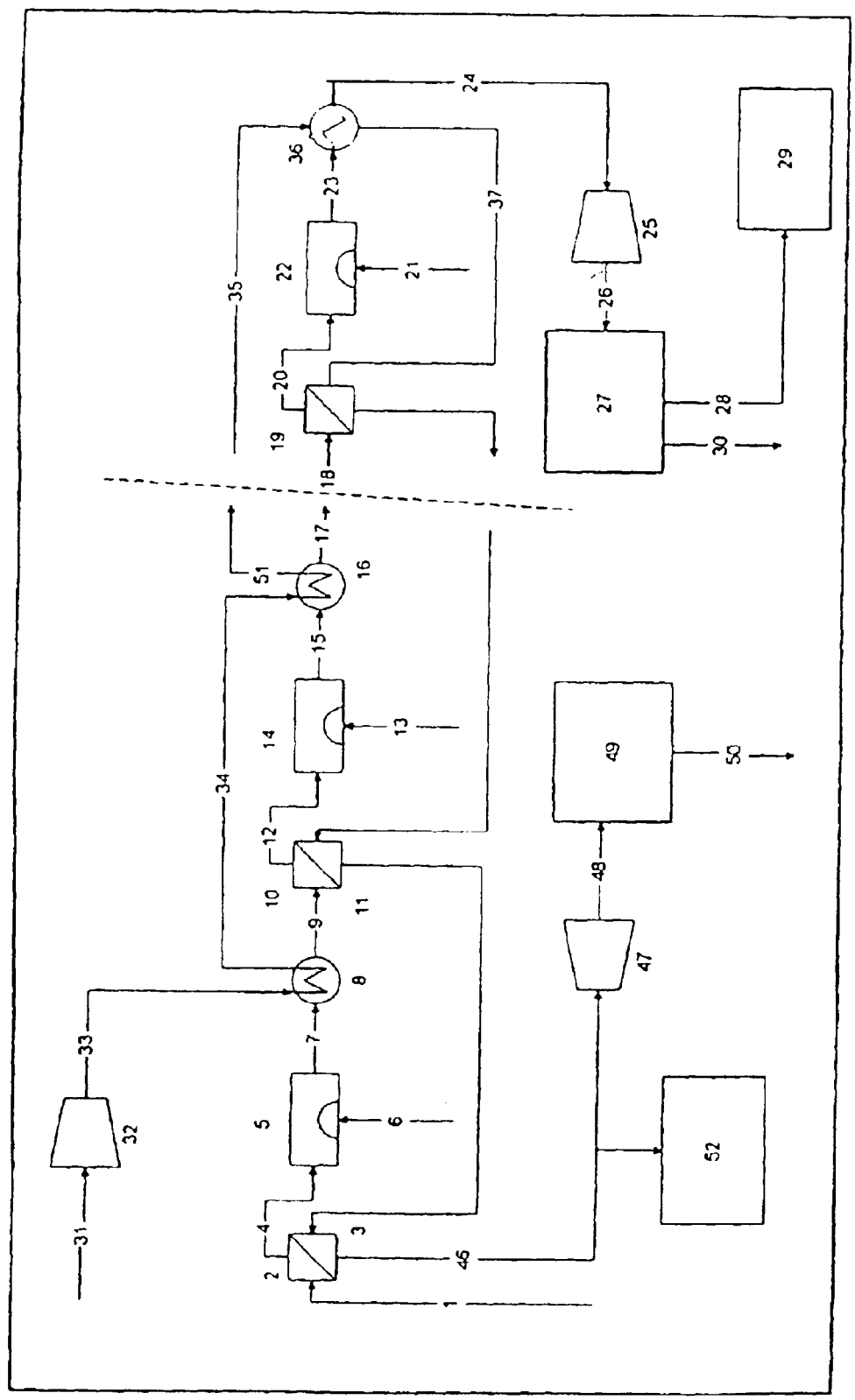
FIG. 1 shows a power and heat generating process according to the invention comprising a staged MCM process with inter stage combustion and heat recovery. Air is heated in several stages.

FIG. 1 shows a combined power and heat generating process comprising application of a staged Mixed Conducting Membrane (MGM) and combusters where a sweep gas 1 is fed to the permeate side 2 of a first stage MCM 3 (stage 1) to pick up oxygen transported through said membrane 3. The mixture of sweep gas and oxygen is fed to a catalytic or non-catalytic burner 5 where a fuel 6 is combusted. Hot exhaust gas 7 is fed to a heat exchanger 8 where compressed air 33 is heated. Partially cooled exhaust gas 9 is used as sweep gas on the permeate side 10 of a second MCM 11 (stage 2). Oxygen containing gas 12 is mixed with a fuel 13 in a catalytic or non-catalytic burner 14 to generate a hot exhaust gas 15. Hot exhaust gas 15 with increased amount of $CO_2$ and $H_2O$ is fed to heat exchanger 16 to heat compressed air 34. Partially cooled exhaust gas 17 is used as sweep gas in a next MCM stage (not shown). The number of required MCM-stages depends on the amount of sweep gas fed to the first MCM-stage. A hot exhaust gas with increased amount of $CO_2$ and $H_2O$ is used as sweep gas on the permeate side of the last MCM stage 19. Oxygen containing sweep gas 20 is mixed with a fuel 21 in a catalytic or non-catalytic burner 22 to generate a hot exhaust gas 23. This $CO_2$ containing exhaust gas is heat exchanged with compressed air 35 and the $CO_2$-containing exhaust gas 24 is further depressurized in turbine generator 25 to generate power. Depressurized exhaust gas 26 is fed to heat recovery system 27 to produce steam and condensate water 30. High concentrated $CO_2$ is recovered and fed to a $CO_2$ injection system 29.

Air 31 at ambient conditions is fed to compressor 32. Compressed air 33 is farther heated in heat exchanger 8 and 16 and further in several stages (not shown) including the last heat exchanger 36. Heated air 37 is fed to the retentate side of MCM 19 and further through several MCM stages including MCM 11 and MCM 3. Partly oxygen depleted air 46 is depressurised in turbine generator 47 to generate power or is fed to a mixed conducting membrane 52 capable of producing pure oxygen or synthesis gas. Depressurised oxygen depleted air 48 is fed to heat recovery system 49 and the cooled gas 50 is discharged off.

Figure 2:
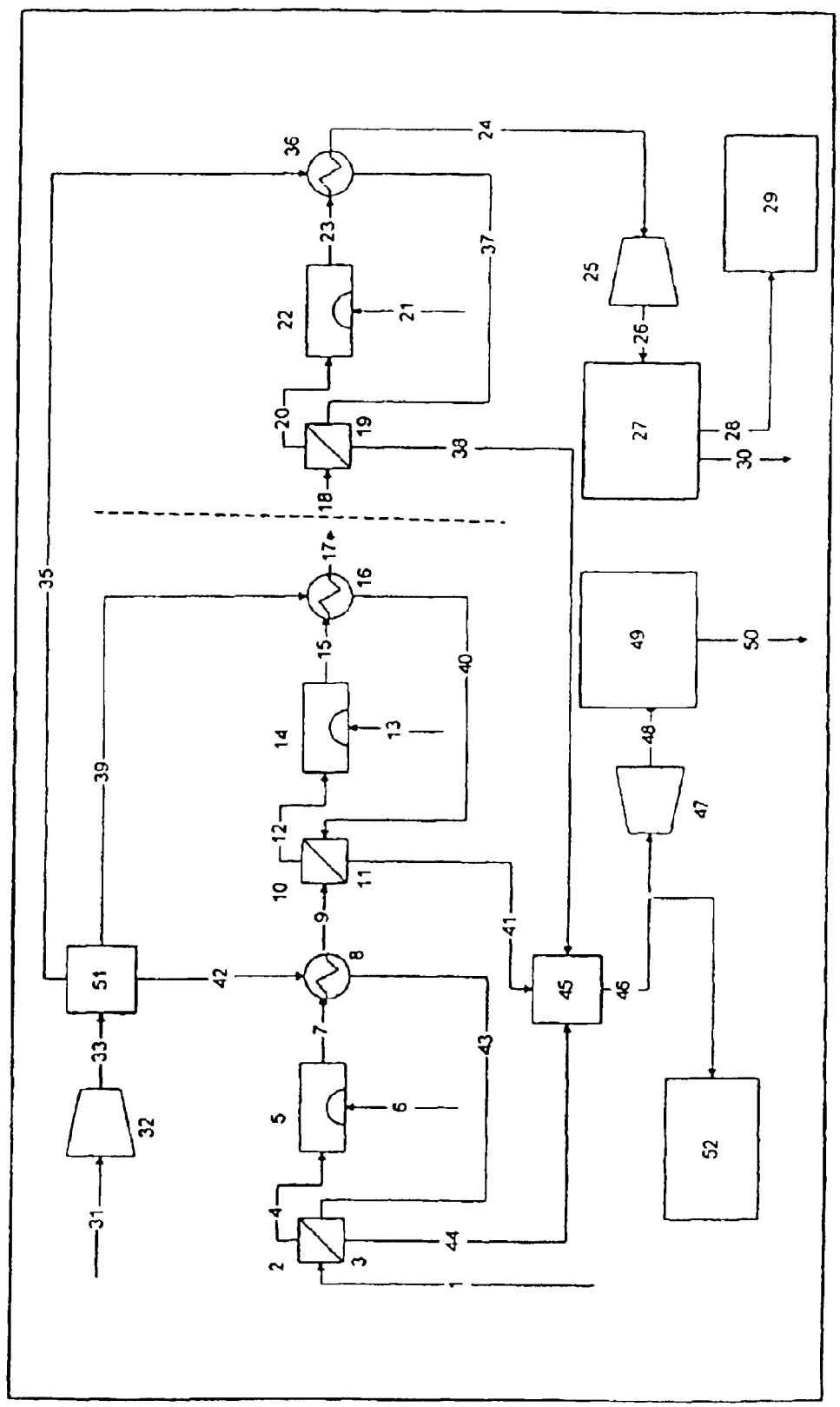
FIG. 2 shows a power and heat generating process according to the invention comprising a staged MCM process with inter stage combustion and heat recovery. The air stream from the compressor is divided into several streams and each air stream is heated in a heat exchanger located between two MCM stages.

FIG. 2 shows a combined power an*it generating process comprising application of a staged Mixed Conducting Membrane (MCM) process where a sweep gas 1 is fed to the permeate side 2 of a first stage MCM 3 to pick up oxygen transported through said membrane 3. The mixture of sweep gas and oxygen is fed to a catalytic or non-catalytic burner 5 where a fuel 6 is combusted. Hot exhaust gas 7 is fed to heat exchanger 8 where compressed air is heated. Partially cooled exhaust gas 9 is used as sweep gas on the permeate side 10 of a second MCM 11 (stage 2). Oxygen containing gas 12 is mixed with a fuel 13 in a catalytic or non-catalytic burner 14 to generate a hot exhaust gas 15. Hot exhaust gas 15 with increased amount of $CO_2$ and $H_2O$ is fed to heat exchanger 16 to heat compressed air. Partially cooled exhaust gas 17 is used as sweep gas in a next MCM stage (not shown). The number of required MCM-stages depends on the amount of sweep gas fed to MCM-stage one. A hot exhaust gas with increased amount of $CO_2$ and $H_2O$ is used as sweep gas on the permeate side of a last MCM stage 19. Oxygen containing sweep gas 20 is mixed with a fuel 21 in a catalytic or non-catalytic burner 22 to generate a hot exhaust gas 23. This -$CO_2$ containing exhaust gas is heat exchanged with compressed air 35 and the gas 24 is further depressurized in turbine generator 25 to generate power. Depressurized exhaust gas 26 is fed to heat recovery system 27 to produce steam and condensate water 30. High concentrated $CO_2$ is recovered and fed to a $CO_2$ injection system 29.

Air 31 at ambient conditions is fed to compressor 32. Compressed air 33 is further divided into several air streams equal the number of MCM stages. Compressed air stream 35 is heated in heat exchanger 36 and the hot air stream 37 is fed to the retentate side of MCM 19. Oxygen depleted air 38 is fed to mixer 45. Compressed air stream 39 is heated in heat exchanger 16 and the hot air stream 40 is fed to the retentate side of MCM 11. Oxygen depleted air 41 is fed to mixer 45. Compressed air stream 42 is heated in heat exchanger 8 and the hot air stream 43 is fed to the retentate side of MCM 3. Oxygen depleted air 44 is fed to mixer 45. The remaining air streams from separator 51 is fed to the remaining heat exchanger and MCM-stages (not shown) and the resulting hot oxygen depleted air streams is collected in mixer 45. Oxygen depleted air 46 is depressurised in turbine generator 47 to generate power or is fed to a mixed conducting membrane 52 capable of producing pure oxygen or synthesis gas. Depressurised oxygen depleted air 48 is fed to heat recovery system 49 and the cooled gas 50 is discharged.

EXAMPLE 1

This example shows a power generating process as described in FIG. 1.

A hot sweep gas 1 at about 500 to 1200° C. and at elevated pressure consisting of steam or a mixture of steam and $CO_2$ or recycled exhaust gas (part of stream 28 or stream 24) is fed to the permeate side 2 of a first Mixed Conducting Membrane (MCM) 3 (stage 1) to pick up oxygen transported through said membrane 3. The mixture of sweep gas and oxygen which may contain at least 5% oxygen is fed to a catalytic or non-catalytic burner 5 where a fuel 6 (i.e. natural gas or synyhesis gas) is combusted. Hot exhaust gas 7 at about 800 to 1500° C. is fed to heat exchanger 8 where compressed air 33 is heated up to between 500 and 750° C. Partially cooled exhaust gas 9 at 500 to 1200° C. is used as sweep gas on the permeate side 10 of a second MCM 11 (stage 2). Oxygen containing gas 12 is mixed with a fuel 13 in a catalytic or non-catalytic burner 14 to generate a hot LA exhaust gas 15. Hot exhaust gas 15 at 1000 to 1500° C. with increased amount of $CO_2$ and $H_2O$ is fed to heat exchanger 16 to heat compressed air 34. Partially cooled exhaust gas 17 is used as sweep gas in a next MCM stage (not shown).

The number of required MCM-stages depends on the amount of sweep gas fed to MCM-stage one. Application of 10 MCM stages will reduce the required amount of sweep gas with about 95% compared with a one stage air heating process as shown in table 1. The amount of sweep gas inlet stage one is 233 kmol/hr and the amount of sweep gas inlet stage 10 is increased to 631 kmol/hr due to the addition of a carbon containing fuel to the burners (5, 15, 22 etc.) between each MCM stage and due to addition of oxygen transported through the mixed conducting membranes. The total amount of oxygen produced in all the MCM stages is about 318 kmol/hr if the concentration of oxygen outlet each burner is 3%. By applying 10% oxygen in sweep gas out of a mixed conducting membrane in a one stage process 70% of the recovered oxygen can be used in a combustion process. The amount of sweep gas required to produce 318 kmol/hr of oxygen will then be 4443 kmol/hr. Application of 10 stages will reduce the required amount to 233 kmol/hr i.e. 95% reduction. Table 1 also shows the inlet air temperature of each heat exchanger (8, 16, 36 etc.) and the concentration of $CO_2$ and $H_2O$ in inlet sweep gas of each mixed conducting membrane stage. The $CO_2$ in the exhaust gas from the last stage may be recovered by cooling the exhaust gas stream to below 50° C. to condensate water. This will increase the concentration of $CO_2$ to above 95%. A hot exhaust gas 18 at 1000 to 1300° C. with increased amount of $CO_2$ and $H_2O$ is used as sweep gas on the permeate side of the last MCM stage 19. Oxygen containing sweep gas 20 is mixed with fuel 21 in a catalytic or non-catalytic burner 22 to generate hot exhaust gas 23. This $CO_2$-containing exhaust gas at 1100 to 1500° C. is heat exchanged with compressed air 35 and the gas 24 is further depressurized in turbine generator 25 to near atmospheric pressure to generate power. Depressurized exhaust gas 26 is fed to heat recovery system 27 to produce steam and condensate water 30. High concentrated CO2 is recovered and fed to a $CO_2$ injection system 29 where $CO_2$ is compressed and dried.

Air 31 at ambient conditions is fed to compressor 32. Compressed air 33 is further heated in heat exchanger 8 and 16 and further in several stages (not shown) including the last heat exchanger 36 up to between 800 and 1400° C. Heated air 37 is fed to the retentate side of MCM 19 and further through several MCM stages including MCM 11 and MCM 3. Oxygen depleted air 46 is depressurised in turbine generator 47 to near atmospheric pressure to generate power or is fed to a mixed conducting membrane capable of producing pure oxygen or synthesis gas. Depressurised oxygen depleted air 48 is fed to heat recovery system 49 and the cooled nitrogen-containing gas 50 is discharged off.

TABLE 1

| Stage nr. | Inlet Air temperature, ° C. | % $CO_2$ in sweep gas inlet stage | % $H_2O$ in sweep gas inlet stage | $O_2$ transported through MCM kmol/hr |
|---|---|---|---|---|
| 1 | 454 | 0 | 100 | 26.1 |
| 2 | 461 | 3.65 | 93.34 | 20.9 |
| 3 | 500 | 6.92 | 90.06 | 23.3 |
| 4 | 544 | 9.86 | 87.11 | 25.9 |
| 5 | 592 | 12.50 | 84.46 | 28.9 |
| 6 | 645 | 14.87 | 82.08 | 32.4 |
| 7 | 704 | 17.01 | 79.93 | 36.1 |
| 8 | 769 | 18.94 | 77.99 | 39.6 |
| 9 | 840 | 20.65 | 76.28 | 44.1 |
| 10 | 919 | 22.18 | 74.73 | 49.1 |
| Exit stage 10 | 1006 | 23.56 | 73.35 | |

EXAMPLE 2

This example shows a power generating process as described in FIG. 2.

The system for generation of sweep gas is the same as described in excample 1 and FIG. 1. But compressed air 33 is further divided into several air streams equal the number of MCM stages. Compressed air stream 35 is heated in heat exchanger 36 to between 800 and 1400° C. and the hot air stream 37 is fed to the retentate side of MCM 19. Oxygen depleted air 38 is fed to mixer 45. Compressed air stream 39 is heated in heat exchanger 16 to between 800 and 1400° C. and the hot air stream 40 is fed to the retentate side of MCM 11. Oxygen depleted air 41 is fed to mixer 45. Compressed air stream 42 is heated in heat exchanger 8 to between 800 and 1400° C. and the hot air stream 43 is fed to the retentate side of MCM 3. Oxygen depleted air 44 is fed to mixer 45. The remaining air streams from separator 51 is fed to the remaining heat exchanger and MCM-stages (not shown) and the resulting hot oxygen depleted air streams is collected in mixer 45. Oxygen depleted hot air 46 at 800 to 1400° C. is depressurised in turbine generator 47 to generate power or is fed to a mixed conducting mebrane capable of producing pure oxygen or synthesis gas. Depressurised oxygen depleted air 48 is fed to heat recovery system 49 and the cooled nitrogen-containing gas 50 is discharged.

An alternative configuration of the process according to FIGS. 1 and 2, comprises that the $CO_2$ containing gas stream 24 is mixed with a fuel and fed to a catalytic burner in order to remove oxygen. The amount of fuel is regulated such that the concentration of oxygen is reduced to below 50 to 100 ppm. The $CO_2$ containing exhaust gas with a low concentration of oxygen is depressurised in turbine generator 25 to generate power and heat is further recovered in 27. The $CO_2$-containing gas after recompression and drying may be injected for enhanced oil recovery.

An alternative configuration of the process according to FIGS. 1 and 2, comprises that the $CO_2$ containing gas stream 24 is mixed with a fuel and fed to a combined mixed conducting membrane and partial oxidation reactor as described in patent application NO-A-972631 (published Jun. 12, 1998) in order to reduce the concentration of oxygen to below 10 ppm. The $CO_2$ containing exhaust gas with a low concentration of oxygen is depressurised in turbine generator 25 to generate power and heat is further recovered in 27. The -$CO_2$ containing gas after recompression and drying may be injected for enhanced gas and oil recovery.

An alternative configuration of the process according to FIGS. 1 and 2, comprises that the $CO_2$ containing gas stream 23 is depressurised in turbine 25 without heatexchanging with air in heat exchanger 36.

Fuel useful in the processes described in example 1 and 2 comprises natural gas, methanol, synthesis gas comprising hydrogen and carbon monoxide, refinery fuel gas containing mixed hydrocarbons or other combustible mixtures.

By the present invention the inventors has arrived at an efficient method to recover substantially all $CO_2$ generated in a combustion process.

The required amount of sweep gas may be reduced without increasing the required mixed conducting membrane area or without reducing the partial pressure of recovered oxygen. This will reduce the costs and increase the process efficiency.

The method according to the present invention can be used in several types of heat and power generating processes as Combined Cycle Power Plants, in Cogeneration power and heat plants, in Integrated Gasification and Combined Cycle power plants, in any processes comprising combustion of a fuel or for heating purposes e.g. in chemical plants or for heating air fed to mixed conducting membranes.

What is claimed is:

1. An energy efficient method for recovering substantially all carbon dioxide generated in a combustion process which includes an application of sweep gas in combination with a mixed conducting membrane, characterised in that said method comprises the following steps:

a) a sweep gas is used to pick up oxygen on the permeate side of a mixed conducting membrane in a first stage which is capable of separating oxygen from a pre-heated air stream fed to the retentate side of said membrane, b) the sweep gas containing oxygen is applied as oxidant in a combuster in said first stage to which a carbon containing fuel is separately fed and combusted, c) pre-heated combustion products of step b) containing $CO_2$, $H_2O$ and a low concentration of $O_2$ are used as sweep gas to pick up oxygen on the permeate side of a second mixed conducting membrane in a second stage downstream the combuster in step b) which is capable of separating oxygen from a pre-heated air stream fed to the retentate side of said second membrane, d) the concentration of oxygen in the sweep gas of step c) is increased in the second membrane in said second stage (step c) to a sufficiently high level to be used as oxidant in the combuster in said second stage to which a carbon containing fuel is separately fed and combusted, and e) the steps c)–d) are repeated in one or more stages, where each stage includes a membrane and a combustor.

2. A method for recovering substantially all carbon dioxide generated in a combustion process according to claim 1, characterised in that the combuster is a catalytic combuster.

3. A method for recovering substantially all carbon dioxide generated in a combustion process according to claim 1, characterised in that the sweep gas used in step a) is superheated steam or a mixture of steam and recycled exhaust gas from the last combuster in the sequence.

4. A method for recovering substantially all carbon dioxide generated in a combustion process according to claim 1, characterised in that the air stream is heated by heat exchanging with exhaust gas generated in at least one combuster.

5. A method for recovering substantially all carbon dioxide generated in a combustion process according to claim 1, characterised in that the air stream, before being heated, is compressed and divided into several streams and each stream is heated in a heat exchanger located between two membrane stages.

6. A method for recovering substantially all carbon dioxide generated in a combustion process according to claim 1, characterised in that the combuster is a non-catalytic combuster.

7. A method according to claim 1, characterised in that the number of stages depends on the amount of sweep gas fed to the mixed conducting membrane in said first stage and on the required pre-heating temperature of air fed to the retentate side of the mixed conducting membrane.

8. A method according to claim 1, characterised in that the concentration of oxygen in the oxygen-enriched sweep gas is below 10%.

* * * * *